Patented Aug. 30, 1932

1,875,312

UNITED STATES PATENT OFFICE

MERRILL A. YOUTZ, OF HAMMOND, INDIANA, ASSIGNOR TO STANDARD OIL COMPANY, OF CHICAGO, ILLINOIS, A CORPORATION OF INDIANA

HYDROLYZING OLEFINE OXIDES

No Drawing.   Application filed November 4, 1929.   Serial No. 404,864.

This invention relates to processes of preparing glycols and it comprises a process wherein olefin oxides are treated with relatively large quantities of water containing a hydrolizing catalyst whereby the oxides are converted to glycols without appreciable, or detrimental, yields of poly-glycols or other undesirable condensation products.

Of the various ways of preparing glycols, that method which includes the formation of olefin oxides and conversion thereof to glycols has received but little consideration in practice. Prior workers have generally thought it better to convert chlorhydrins directly to glycols by processes using strong alkalies, such as sodium hydroxide, care being taken to prevent the liberation of free olefin oxides. While yields of glycol by this method are acceptable, the process leaves much to be desired.

Nearly 100 percent conversion of chlorhydrins to olefin oxides is possible without complicated chemical control and these oxides can be prepared in a very nearly pure state. When converting mixed chlorhydrins to olefin oxides, the liberated oxides can be fractionated without difficulty. A satisfactory method of forming glycols from olefin oxides accordingly will permit the preparation of practically pure glycols.

The olefin oxides, such as ethylene, propylene, and butylene oxides, these being the more common ones, are reactive with water to form glycols. While their reactivity with water is relatively slow, hydrolyzing catalysts can be used to speed up the conversion to glycols. These catalysts are generally of an acidic nature. Sulphuric acid is a common one but phosphoric and other acids are suitable. Most likely hydrogen ions are the ultimate catalysts.

The reaction between olefin oxides and water is simple enough but, unless special precautions as to the temperature of hydrolysis have been taken, the glycols formed during the hydrolysis will in time react with olefin oxide present to form polyglycols. This reactivity between gycols and olefin oxides decreases as the molecular weight of the oxide increases but the formation of polyglycols is nevertheless a disadvantage with all of the common olefin oxides. Ethylene oxide, when hydrolyzed with water and an acid catalyst, not only forms ethylene glycol but also appreciable quantities of polyglycols. For example, if 44 parts by weight of ethylene oxide are heated at 100° C. with 108 parts by weight of water, a molecular ratio of 1 to 6, the glycol yield amounts to but 65 to 70 percent. When 44 parts of ethylene oxide are heated at 100° C. with 19.8 parts of water, a molecular ratio of 1 to 1.10, over 50 percent of the ethylene oxide is converted to polyglycols. In both instances, the water contained about 0.05 percent sulfuric acid as a catalyst.

This reactivity between ethylene glycol and its oxide has militated against the use of ethylene oxide as a basic raw material for making glycols and has compelled prior workers to resort to the hydrolysis of ethylene chlorhydrin with strong alkalies in such a way that the chlorhydrin is converted directly to glycol.

Although it has been proposed to form anhydrous glycols by using molecular equivalents of olefin oxide and water, I do not find this process generally satisfactory excepting with propylene oxide and higher oxides and even when using these less reactive oxides, I can not hasten the hydrolysis of the oxides by the aid of heat without running the danger of forming polyglycols. While anhydrous glycols can be formed by using molecular equivalents of olefin oxides and water, care must be taken to keep the temperature of hydrolysis below that at which polyglycols are likely to be formed and this requires that the hydrolyzing process be slowed up.

It is highly desirable to convert the olefins to glycols as rapidly as possible. Hydrolyzing catalysts materially increase the reaction rate and so does heating. As stated, however, when relatively small quantities of water are used, in an attempt to prepare anhydrous or concentrated glycols, heating leads to polyglycol formation.

It is therefor an object of this invention to provide a process whereby olefin oxides can be converted to glycols with rapidity under heating conditions without running the risk of forming polyglycols or other undesirable products.

I have now found that the formation of polyglycols can be avoided at elevated temperatures provided I have large volumes of water present during the hydrolysis reaction.

For example, I heat 44 parts by weight of ethylene oxide with 360 parts by weight of water containing 0.05 percent of sulphuric acid as a catalyst. Under these conditions, with a molecular ratio of oxide to water of 1 to 20, and at a temperature of 100° C., the solution of oxide in water being heated in a sealed container, I obtain a glycol yield amounting to 85% and no polyglycols are formed as a by-product. The resulting solution contains substantially pure ethylene glycol and is free of any undesirable impurities. On a large scale, I find that practically 100 percent conversion of ethylene oxide to glycol is possible even at the elevated temperature specified so long as large excesses of water are present.

The resulting dilute glycol solution can be freed from sulfuric acid in many ways. It is most convenient to simply add sufficient calcium carbonate to react with all of the sulfuric acid. The resulting precipitate of calcium sulphate and any excess carbonate is easily removed by simple filtration.

Glycol solutions prepared in accordance with my process are quite dilute. That obtained in accordance with the foregoing example contains about 15% of ethylene glycol. However, it is not a difficult matter to concentrate dilute glycol solutions.

In general I find it most advantageous to have sufficient water present during the reaction so that the resulting ethylene glycol solution has a concentration of not more than 25 percent.

It is sometimes necessary to recover glycol from very dilute glycol solutions, in which case I find it convenient to employ these solutions in place of water for hydrolyzing the olefine oxide, providing, of course, that the concentration is sufficiently low to prevent polyglycol formation.

Propylene and butylene oxides do not form polyglycols as readily as ethylene oxide. If the temperature of the reaction is kept not greatly in excess of the boiling point of the oxide used, acceptable yields of propylene and butylene glycol can be obtained even when using only enough water to form very strong glycol solutions. But when heated in a closed container at elevated temperatures, in order to hasten the reaction, for example, at 100° C. or higher, polyglycols tend to form. However, when using a large excess of water I find that I can operate at elevated temperatures and under a pressure sufficient to retain the oxide in solution without forming polyglycols and am thus enabled to materially increase the rate at which the hydrolysis proceeds.

Of course the actual time required to complete the conversion of a given amount of oxide to water will depend somewhat upon the nature of the oxide and the quantities thereof being reacted. I continue the heating at a temperature generally not in excess of 100°–110° C. until a test shows that the solution no longer retains free oxide. Usually heating at 100° C. for an hour is sufficient.

Likewise, when using propylene and butylene oxide or mixtures of two or more oxides, I find it advantageous to have sufficient water present so that the resulting glycol solution formed will have a concentration of about 15 to 25%.

What is claimed is:—

1. The process of preparing glycols which comprises mixing approximately one molal weight of an olefin oxide with about 20 molal weights of water containing a hydrolyzing catalyst, and thereafter heating the mixture substantially above the boiling point of the oxide.

2. The process of preparing glycols which comprises mixing an olefin oxide with a quantity of water such that on reaction thereof with the oxide, the resulting glycol solution has a concentration of not more than 25%, the water containing a hydrolyzing catalyst, and thereafter heating the mixture substantially above the boiling point of the oxide.

3. The process as in claim 1 wherein ethylene oxide is used.

4. The process as in claim 2 wherein ethylene oxide is used.

MERRILL A. YOUTZ.